United States Patent
Negishi et al.

(10) Patent No.: US 8,492,299 B2
(45) Date of Patent: *Jul. 23, 2013

(54) OPTICAL GLASS

(75) Inventors: Tomoaki Negishi, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,748

(22) Filed: Jan. 26, 2012

(65) Prior Publication Data

US 2012/0142517 A1    Jun. 7, 2012

Related U.S. Application Data (62) Division of application No. 12/570,436, filed on Sep. 30, 2009, now Pat. No. 8,127,570.

(30) Foreign Application Priority Data

Sep. 30, 2008  (JP) ................. 2008-253900

(51) Int. Cl.
*C03C 3/066* (2006.01)
*C03C 3/068* (2006.01)

(52) U.S. Cl.
USPC ................. 501/79; 501/78; 501/51

(58) Field of Classification Search
USPC .............................. 501/51, 78, 79
See application file for complete search history.

(56) References Cited

U.S. PATENT DOCUMENTS

| | | | |
|---|---|---|---|
| 6,912,093 | B2 | 6/2005 | Endo |
| 7,560,405 | B2 | 7/2009 | Hayashi et al. |
| 8,110,514 | B2 * | 2/2012 | Negishi et al. ......... 501/51 |
| 2003/0211929 | A1 | 11/2003 | Hayashi et al. |
| 2004/0220041 | A1 | 11/2004 | Isowaki et al. |
| 2004/0235638 | A1 | 11/2004 | Uehara et al. |
| 2005/0197243 | A1 | 9/2005 | Hayashi |
| 2006/0105900 | A1 | 5/2006 | Kasuga et al. |
| 2006/0189473 | A1 | 8/2006 | Endo |
| 2008/0287280 | A1 | 11/2008 | Onoda et al. |
| 2009/0176641 | A1 | 7/2009 | Kobayashi et al. |
| 2009/0197754 | A1 | 8/2009 | Uehara et al. |
| 2009/0325779 | A1 | 12/2009 | Negishi et al. |
| 2011/0028300 | A1 | 2/2011 | Zou et al. |
| 2012/0100981 | A1 * | 4/2012 | Negishi et al. ......... 501/42 |

FOREIGN PATENT DOCUMENTS

| | | |
|---|---|---|
| CN | 1524815 A | 9/2004 |
| JP | 59013647 A | 1/1984 |
| JP | 2005179142 A | 7/2005 |
| JP | 2006248897 A | 9/2006 |
| JP | 2007-269584 | 10/2007 |
| JP | 2009-143738 | 7/2009 |
| JP | 2009-167075 | 7/2009 |
| JP | 2009-167076 | 7/2009 |
| JP | 2009-167077 | 7/2009 |
| JP | 2009-167078 | 7/2009 |
| WO | 2007-148816 A1 | 12/2007 |
| WO | WO 2009096439 A1 | 8/2009 |

OTHER PUBLICATIONS

Derwent Abstract 2007-836461 Abstract of JP 2007-269574 A, Oct. 18, 2007.
English language excerption of Official Action issued in JP 2008-263900 dated Sep. 25, 2012.
English language excerption of Official Action issued in JP 2012-188315 dated Sep. 25, 2012.
Chinese Office Action and English translation in CN 200910174549.1 dated Jan. 23, 2013.
English language excerpt of Official Action issued on Japanese Patent Application No. 2013-008066 dated Apr. 9, 2013.

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

A high-refractivity low-dispersion optical glass that can be stably supplied and has excellent glass stability and that has coloring reduced, composed of in mass %, 5 to 32% of total of $SiO_2$ and $B_2O_3$, 45 to 65% of total of $La_2O_3$, $Gd_2O_3$ and $Y_2O_3$, 0.5 to 10% of ZnO, 1 to 20% of total of $TiO_2$ and $Nb_2O_5$, and optionally other components. The optical glass has a refractive index nd of 1.89 to 2.0, an Abbe's number vd of 32 to 38 and a coloring degree λ70 of 430 nm or less.

10 Claims, 1 Drawing Sheet

OPTICAL GLASS

This application is a divisional of application Ser. No. 12/570,436 filed Sep. 30, 2009 now U.S. Pat. No. 8,127,570, now allowed, which in turn claims priority of Japanese application Serial No. 2008-253900 filed Sep. 30, 2008, the entire content of which is hereby incorporated by reference in this application.

TECHNICAL FIELD

This invention relates to an optical glass having high-refractivity low-dispersion properties, a press-molding glass gob and an optical element formed of the above optical glass each, and processes for producing an optical element blank and an optical element.

BACKGROUND ART

When combined with a lens formed of a high-refractivity high-dispersion glass, a lens formed of a high-refractivity low-dispersion glass ensures that an optical system can be downsized while correcting chromatic aberration. It hence occupies an important place as an optical element constituting an image-sensing optical system and a projection optical system such as a projector, etc.

JP 2007-269584 A discloses such a high-refractivity low-dispersion glass. The glass disclosed in JP 2007-269584A has a refractive index nd of 1.75 to 2.00 and has a $Ta_2O_5$ content in the range of 0 to 25 mass %. However, all of the glasses that have a refractive index nd of at least 1.85 contain a large amount of $Ta_2O_5$. That is because it is indispensable to introduce a large amount of $Ta_2O_5$ for securing glass stability in the high refractivity region such as a refractive index nd of 1.75 or more. For such a high-refractivity low-dispersion glass, therefore, $Ta_2O_5$ is a main and essential component.

DISCLOSURE OF THE INVENTION

Problems to be Solved by the Invention

Meanwhile, tantalum (Ta) is an element having a high rarity value and is in itself a very expensive substance. Moreover, rare metal prices are recently soaring worldwide, and the supply of tantalum is deficient. In the field of glass production, tantalum as a raw material is also deficient, and if such a situation continues, it may be no longer possible to maintain the stable supply of high-refractivity low-dispersion glasses that are essential and indispensable in the industry of optical apparatuses. Similarly, germanium (Ge) is a substance that increases the refractive index without impairing the glass stability when used as a glass component, while it is a more expensive substance than tantalum, and it is required to decrease its use in amount.

Meanwhile, the optical element for constituting the image-sensing optical system or the projection optical system requires a remarkably coloring-free glass material. These optical systems use a plurality of lens for correcting various aberrations, and when the transmitted light quantity per lens is not sufficient, the transmitted light quantity of the entire optical system is greatly decreased. In particular, an interchangeable lens of a single-lens reflex camera has a large aperture as compared with a lens of a compact camera and has a large thickness itself, so that when a glass having a poor coloring degree is used, the transmitted light quantity of the entire interchangeable lens is sharply decreased. For these reasons, an optical glass whose coloring is reduced is required in order to make the most of the high-refractivity low-dispersion properties.

Under the circumstances, it is an object of this invention to provide a high-refractivity low-dispersion optical glass that can be stably supplied and has excellent glass stability, a press-molding glass gob and an optical element that are formed of the above glass, and processes for the production of an optical element blank and an optical element.

Means to Solve the Problems

For achieving the above object, the present inventors have made diligent studies and as a result have found that the above object can be achieved by an optical glass having a specified glass composition, a specified refractive index and a specified Abbe's number, and the present invention has been accordingly completed on the basis of this finding.

That is, this invention provides (1) an optical glass comprising, by mass %, 5 to 32% of total of $SiO_2$ and $B_2O_3$,
45 to 65% of total of $La_2O_2$, $Gd_2O_2$ and $Y_2O_3$,
0.5 to 10% of ZnO,
1 to 20% of total of $TiO_2$ and $Nb_2O_5$,
0 to 15% of $ZrO_2$,
0 to 2% of $WO_2$,
0 to 20% of $Yb_2O_3$,
0 to 10% of total of $Li_2O$, $Na_2O$ and $K_2O$,
0 to 10% of total of MgO, CaO, SrO and BaO,
0 to 12% of $Ta_2O_5$,
0 to 5% of $GeO_2$,
0 to 10% of $Bi_2O_2$, and
0 to 10% of $Al_2O_2$, wherein the mass ratio of the content of $SiO_2$ to the content of $B_2O_2$, ($SiO_2/B_2O_3$), is from 0.3 to 1.0, and the mass ratio of the total content of $Gd_2O_2$ and $Y_2O_2$ to the total content of $La_2O_3$, $Gd_2O_3$ and $Y_2O_3$, $(Gd_2O_3+Y_2O_3)/(La_2O_3+Gd_2O_3+Y_2O_3)$, is from 0.05 to 0.6, the optical glass having a refractive index nd of 1.89 to 2.0 and an Abbe's number vd of 32 to 38 and having a coloring degree λ70 of 430 nm or less, (2) an optical glass of the above (1), which contains 2 to 15% of $SiO_2$ and 6 to 30% of $B_2O_3$, (3) an optical glass of the above (1) or (2), which contains 25 to 65% of $La_2O_3$, 0 to 25% of $Gd_2O_3$ and 0 to 20% of $Y_2O_3$, (4) an optical glass of any one of the above (1) to (3), which contains 0.1 to 15% of $TiO_2$ and 0.1 to 15% of $Nb_2O_5$, (5) an optical glass of any one of the above (1) to (4), which contains 0.5 to 15% of $ZrO_2$, (6) an optical glass of any one of the above (1) to (5), which has a $Ta_2O_5$ content of 0 to 10%, (7) an optical glass of any one of the above (1) to (6), which is a Ge-free glass, (8) an optical glass of any one of the above (1) to (7), which has a liquidus temperature of 1,300° C. or lower, (9) an optical glass of any one of the above (1) to (8), which has a glass transition temperature of 710° C. or lower, (10) a press-molding glass gob formed of the optical glass recited in any one of the above (1) to (9), (11) an optical element formed of the optical glass recited in any one of the above (1) to (9), (12) a process for producing an optical element blank that is completed into an optical element by grinding and polishing, which comprises heating, softening and press-molding the press-molding glass gob recited in the above (10), (13) a process for producing an optical element blank that is completed into an optical element by grinding and polishing, which comprises melting glass raw materials, press-molding the resultant molten glass and producing the optical element blank formed of the optical glass recited in any one of the above (1) to (9), (14) a process for producing an optical element, which comprises producing an optical element blank by the process recited in the above (12) or (13), and grinding and polishing said optical element blank, and (15) a process for producing an optical element, which comprises heating the glass gob recited in the above (10) and precision press-molding the same.

Effect of the Invention

According to this invention, there can be provided a high-refractivity low-dispersion optical glass that can be stably supplied and has excellent glass stability, a press-molding glass gob and an optical element that are formed of the above glass, and processes for the production of an optical element blank and an optical element.

BEST MODE OF THE INVENTION

[Optical Glass]

First, the optical glass of this invention will be explained below.

This invention seeks to provide a high-refractivity low-dispersion optical glass in which the amounts of $Ta_2O_5$ and $GeO_2$, especially expensive components of glass components, are reduced or limited. When the amount of $Ta_2O_5$ or $GeO_2$ is simply reduced, a glass is not formed or a glass devitrifies and is no longer usable, and it is difficult to impart an optical glass with the high-refractivity low-dispersion properties while maintaining its devitrification resistance. For decreasing the amounts of $Ta_2O_5$ and $GeO_2$ to be introduced while overcoming the above problem, the apportionment of components for imparting high refractivity is essential.

In this invention, $B_2O_3$ and $SiO_2$ are introduced as oxides for forming a glass network, and (a) at least one of $La_2O_3$, $Gd_2O_3$ and $Y_2O_3$, (b) ZnO and (c) at least one of $TiO_2$ and $Nb_2O_5$ are incorporated to be co-present as essential components. In this invention, ZnO is an essential component that not only contributes to an improvement in meltability and a decrease in glass transition temperature but also contributes to impartment with high-refractivity low-dispersion and an improvement in devitrification resistance.

On the basis of the above formulation, a balance between the content of $B_2O_3$ and the content of $SiO_2$ is adjusted to improve the meltability and the moldability of a molten glass, and their balance with other components is adjusted.

When the meltability and glass stability are improved, an increase in the melting temperature of a glass can be inhibited, which keeps the glass from eroding materials that constitute a glass melting vessel. As a result, the amount of substances that deteriorate the coloring such as platinum ion to be melted into a molten glass can be reduced or inhibited, and a glass whose coloring is reduced can be obtained.

Further, the coloring of the glass is inhibited by restricting the upper limit of the total content of $TiO_2$ and $Nb_2O_5$ that improve the glass stability. On the basis of these findings, this invention has achieved the above object.

The optical glass of this invention comprises, by mass %,
5 to 32% of total of $SiO_2$ and $B_2O_3$,
45 to 65% of total of $La_2O_2$, $Gd_2O_2$ and $Y_2O_3$,
0.5 to 10% of ZnO,
1 to 20% of total of $TiO_2$ and $Nb_2O_5$,
0 to 15% of $ZrO_2$,
0 to 2% of $WO_2$,
0 to 20% of $Yb_2O_3$,
0 to 10% of total of $Li_2O$, $Na_2O$ and $K_2O$,
0 to 10% of total of MgO, CaO, SrO and BaO,
0 to 12% of $Ta_2O_5$,
0 to 5% of $GeO_2$,
0 to 10% of $Bi_2O_2$, and
0 to 10% of $Al_2O_2$,
wherein the mass ratio of the content of $SiO_2$ to the content of $B_2O_2$, ($SiO_2/B_2O_2$), is from 0.3 to 1.0, and the mass ratio of the total content of $Gd_2O_2$ and $Y_2O_2$ to the total content of $La_2O_2$, $Gd_2O_2$ and $Y_2O_3$, $(Gd_2O_2+Y_2O_3)/(La_2O_2+Gd_2O_3+Y_2O_2)$, is from 0.05 to 0.6, the optical glass having a refractive index nd of 1.89 to 2.0 and an Abbe's number νd of 32 to 38 and having a coloring degree λ70 of 430 nm or less.

(Reasons for Limiting Compositional Range)

The reasons for limiting the compositional ranges of the optical glass of this invention will be explained below, while the content of each component and each total content depicted by % are based on mass % unless otherwise specified.

Both $SiO_2$ and $B_2O_3$ are network-forming oxides, and they are essential components for maintaining the glass stability. When the total content of $SiO_2$ and $B_2O_3$ is less than 5%, it is difficult to maintain glass stability, and the glass is liable to devitrify during production. When the above total content exceeds 32%, the refractive index is decreased. The total content of $SiO_2$ and $B_2O_3$ is hence limited to 5 to 32%. The total content of $SiO_2$ and $B_2O_3$ is preferably in the range of 5 to 30%, more preferably 7 to 28%, still more preferably 9 to 25%, yet more preferably 12 to 23%.

Of the network-forming oxides, $SiO_2$ has an effect on the maintaining of glass stability, the maintaining of a viscosity suitable for molding a molten glass, the improvement of chemical durability, etc. When it is introduced to excess, it is difficult to achieve the desired refractive index and Abbe's number, the liquidus temperature and glass transition temperature are increased, or the meltability and devitrification resistance of the glass are deteriorated.

$B_2O_3$ has an effect on the maintaining of the meltability of the glass, the inhibition of the liquidus temperature from increasing and the impartment with a low dispersion property. When it is introduced to excess, the glass stability is deteriorated, it is difficult to obtain the desired refractive index, and the chemical durability is deteriorated.

On the condition that the total content of $SiO_2$ and $B_2O_3$ is determined as described above, for realizing the desired optical properties and at the same time achieving the maintenance of glass stability, the maintenance of a viscosity suitable for molding a molten glass, an improvement in chemical durability, the inhibition of the liquidus temperature and glass transition temperature from increasing and an improvement in meltability, it is required to adjust a balance between the content of $SiO_2$ and the content of $B_2O_3$.

When the mass ratio of the content of $SiO_2$ to the content of $B_2O_3$ ($SiO_2/B_2O_3$) is less than 0.3, the glass stability decreases, it is difficult to maintain the viscosity suitable for molding a molten glass, and the chemical durability tends to decrease. When the above mass ratio ($SiO_2/B_2O_3$) exceeds 1.0, the liquidus temperature and the glass transition temperature increase, or the meltability and devitrification resistance of a glass are deteriorated. Further, it is difficult to impart the low-dispersion property. The mass ratio of the content of $SiO_2$ to the content of $B_2O_3$ ($SiO_2/B_2O_3$) is hence adjusted to from 0.3 to 1.0. The mass ratio ($SiO_2/B_2O_3$) is preferably in the range of from 0.3 to 0.9, more preferably from 0.4 to 0.7, still more preferably from 0.4 to 0.8.

For achieving the maintenance of glass stability, the maintenance of a viscosity suitable for molding a molten glass, an improvement in chemical durability, the inhibition of the liquidus temperature and glass transition temperature from increasing and an improvement in meltability, preferably, the content of $SiO_2$ is adjusted to 2 to 15%, and the content of $B_2O_3$ is adjusted to 6 to 30. The content of $SiO_2$ is preferably in the range of 4 to 13%, more preferably 5 to 12%, particularly preferably 5 to 10%. The content of $B_2O_3$ is preferably in the range of 6 to 25%, more preferably 8 to 20%, particularly preferably 9 to 15%.

When the content of $SiO_2$ and the content of $B_2O_3$ are adjusted to the above ranges, the meltability of the glass and the glass stability are improved. Therefore, the melting temperature can be inhibited from increasing, the erosion of refractory materials constituting a glass-melting vessel, such as platinum, is inhibited, and the coloring by the inclusion of an erosion product such as platinum ion in the glass can be inhibited or reduced.

$La_2O_3$, $Gd_2O_3$ and $Y_2O_3$ are not only components for imparting high-refractivity low-dispersion properties but also components for imparting a high refractive index, and they are also components that hardly color the glass. Therefore, if the total content of $La_2O_3$, $Gd_2O_3$ and $Y_2O_3$ can be increased while the glass stability is maintained, it is very effective for realizing a high-refractivity low-dispersion glass whose coloring is reduced. In this invention, the glass stability is improved by optimizing the allocation of $La_2O_3$, $Gd_2O_3$ and $Y_2O_3$ and introducing at least one of $TiO_2$ and $Nb_2O_5$ as will be described later, the total content of $La_2O_3$, $Gd_2O_3$ and $Y_2O_3$ can be increased. The measures that are taken as described above can be also factors that can realize the high-refractivity low-dispersion glass whose coloring is reduced.

When the total content of $La_2O_3$, $Gd_2O_3$ and $Y_2O_3$ is less than 45%, not only it is difficult to realize the desired refractive index and dispersion, but also the chemical durability decreases. When the above total content exceeds 65%, the liquidus temperature increases, and the devitrification resistance is deteriorated. Further, since the viscosity during molding of a molten glass is decreased, the moldability decreases. The total content of $La_2O_3$, $Gd_2O_3$ and $Y_2O_3$ is hence limited to 45 to 65%. The total content of $La_2O_3$, $Gd_2O_3$ and $Y_2O_3$ is preferably in the range of 47 to 63%, more preferably 49 to 61%, still more preferably 51 to 60%.

Of $La_2O_3$, $Gd_2O_3$ and $Y_2O_3$, it is $La_2O_3$ that most effectively works to increase the refractive index while maintaining the glass stability. Since, however, the optical glass of this invention is required to have a high refractive index while maintaining the low dispersion property, it is difficult to secure the sufficient glass stability through the use of only $La_2O_3$ among the above three components. In this invention, therefore, a glass excellent in stability in spite of being a high-refractivity low-dispersion glass is realized by making the content of $La_2O_3$ the largest among the three components and at the same time causing $La_2O_3$ and $Gd_2O_3$ to be co-present or causing $La_2O_3$ and $Y_2O_3$ to be co-present.

For the above reason, the mass ratio of the total content of $Gd_2O_3$ and $Y_2O_3$ to the total content of $La_2O_3$, $Gd_2O_3$ and $Y_2O_3$, $(Gd_2O_3+Y_2O_3)/(La_2O_3+Gd_2O_3+Y_2O_3)$, is determined to be from 0.05 to 0.6. When the above mass ratio is outside the above range, the glass stability decreases, and when a molten glass is molded, the viscosity decreases and the moldability is impaired. For improving the glass stability more, the mass ratio of $(Gd_2O_3+Y_2O_3)/(La_2O_3+Gd_2O_3+Y_2O_3)$ is preferably brought into the range of from 0.1 to 0.5, more preferably brought into the range of from 0.1 to 0.4, still more preferably brought into the range of from 0.1 to 0.3.

Further, for obtaining a glass excellent in glass stability, the mass ratio of the content of $Gd_2O_3$ to the total content of $Gd_2O_3$ and $Y_2O_3$, $(Gd_2O_3)/(Gd_2O_3+Y_2O_3)$, is preferably brought into the range of from 0.1 to 1, more preferably brought into the range of from 0.3 to 1, still more preferably brought into the range of from 0.5 to 1.

In a preferred embodiment of this invention, the content of $La_2O_3$ is limited to 25 to 65%, the content of $Gd_2O_3$ is limited to 0 to 25%, and the content of $Y_2O_3$ is limited to 0 to 20%. When the total content of $La_2O_3$, $Gd_2O_3$ and $Y_2O_3$ and the allocation of $La_2O_3$, $Gd_2O_3$ and $Y_2O_3$ are brought into the above ranges, preferably, when the contents of $La_2O_3$, $Gd_2O_3$ and $Y_2O_3$ are brought into the above ranges, the glass stability is more improved, and the moldability of a molten glass is more improved. Further, the glass melting temperature can be inhibited from increasing, and it can prevent a glass from eroding platinum or a platinum alloy constituting a melting vessel and can consequently prevent platinum or platinum alloy from being dissolved as an ion in the glass to color it or from being included as a solid in the glass.

The content of $La_2O_3$ is preferably in the range of 30 to 60%, more preferably 30 to 58%, still more preferably 32 to 55%. The content of $Gd_2O_3$ is preferably in the range of 0.1 to 20%, more preferably 1 to 18%, still more preferably 2 to 15%, yet more preferably 5 to 15%, further more preferably 7 to 15%. The content of $Y_2O_3$ is more preferably 0.1 to 18%, more preferably 0.1 to 16%, still more preferably 0.1 to 10%.

ZnO is an essential component for realizing the high-refractivity low-dispersion properties, and it works to improve the meltability and devitrification resistance of the glass and to decrease the liquidus temperature and glass transition temperature. When the content of ZnO is less than 0.5%, the refractive index decreases, the liquidus temperature increases, and the devitrification resistance deteriorates. Further, the glass transition temperature increases, and it is required to increase the temperature employed for annealing the glass and the temperature for heating and softening the glass when it is press-molded. When the above content exceeds 10%, it is difficult to realize the desired refractive index. The content of ZnO is therefore limited to 0.5 to 10%. The content of ZnO is preferably in the range of 1 to 10%, more preferably 1 to 8%.

Both of $TiO_2$ and $Nb_2O_5$ are components that greatly work to increase the refractive index. When it is intended to increase the refractive index by only rare earth oxide components such as $La_2O_3$, $Gd_2O_3$ and $Y_2O_3$, the glass stability decreases and the glass is hard to produce. When the rare earth oxides and at least one of $TiO_2$ and $Nb_2O_5$ are caused to be co-present, the refractive index can be increased while the glass stability is maintained. Further, when at least one of $TiO_2$ and $Nb_2O_5$ is introduced, the glass is improved in chemical durability. For producing the above effects, the total content of $TiO_2$ and $Nb_2O_5$ is adjusted to 1% or more. When the above total content exceeds 20%, not only the liquidus temperature increases, but also the viscosity during molding a molten glass decreases to deteriorate the moldability. Further, since the glass transition temperature increases, it is required to increase the annealing temperature, and it is also required to increase the heating temperature when glass materials are heated and press-molded, so that an annealing apparatus and a press mold are greatly thermally deteriorated. Further, the coloring of the glass is intensified. The total content of $TiO_2$ and $Nb_2O_5$ is hence limited to 0 to 20%. The total content of $TiO_2$ and $Nb_2O_5$ is preferably in the range of 2 to 20%, more preferably 2 to 18%, still more preferably 2 to 16%.

The content of $TiO_2$ is preferably adjusted to 0.1% or more for increasing the refractive index and improving the chemical durability and devitrification resistance, and it is preferably adjusted to 15% or less for keeping the liquidus temperature and glass transition temperature low. Therefore, the content of $TiO_2$ is preferably in the range of 0.1 to 15%, more preferably 2 to 13%, still more preferably 2 to 9%.

The content of $Nb_2O_5$ is adjusted to 0.1% or more for increasing the refractive index, further decreasing the liquidus temperature and further improving the devitrification resistance. When the content of $Nb_2O_5$ exceeds 15%, a tendency to an increase in liquidus temperature, a tendency to higher dispersion and a tendency to coloring of the glass begin to appear, so that the content of $Nb_2O_5$ is preferably limited to the range of 0.1 to 15%. The content of $Nb_2O_5$ is more preferably in the range of 1 to 15%, still more preferably 1 to 13%, yet more preferably 1 to 9%.

In this invention, the optical glass is preferably an optical glass having a co-presence of $TiO_2$ and $Nb_2O_5$ as glass components, and such a glass exhibits excellent glass stability while it is a high refractivity glass.

$ZrO_2$ has the effect of increasing the refractive index and improving the chemical durability. Even when it is introduced in a small amount, the above excellent effect is produced. However, when the content thereof exceeds 15%, the glass transition temperature and liquidus temperature increase, and the devitrification resistance is decreased. The content of $ZrO_2$ is hence limited to 0 to 15%. In a preferred embodiment of optical glass of this invention, the content of $ZrO_2$ is adjusted to 0.5 to 15%. The content of $ZrO_2$ is more preferably in the range of 0.5 to 13%, still more preferably 1 to 11%, particularly preferably 2 to 9%.

$WO_3$ is a component that increases the refractive index, decreases the liquidus temperature and contributes to an improvement in devitrification resistance. When the content of $WO_3$ exceeds 2%, the liquidus temperature increases, and the devitrification resistance deteriorates. Further, the coloring of the glass is intensified. The content of $WO_3$ is hence limited to 0 to 2%. The content of $WO_3$ is preferably in the range of 0 to 1.5%, more preferably 0 to 1%, still more preferably 0 to 0.5%. When the coloring of the glass is taken into consideration, it is yet more preferred to incorporate no $WO_3$.

$Yb_2O_3$ works to increase the refractive index, and when it is caused to be co-present with $La_2O_3$, it works to decrease the liquidus temperature and to greatly improve the devitrification resistance. When the content thereof exceeds 20%, the liquidus temperature increases, and the devitrification resistance deteriorates. The content of $Yb_2O_3$ is hence limited to 0 to 20%. The content of $Yb_2O_3$ is preferably in the range of 0 to 18%, more preferably 0 to 16%, still more preferably 0 to 14%, yet more preferably 0 to 8%, further more preferably 0 to 5%, still further more preferably 0 to 2%, yet further more preferably 0 to 1%. However, $Yb_2O_3$ is an expensive component as compared with $La_2O_3$, $La_2O_3$, $Gd_2O_3$ and $Y_2O_3$, and sufficient glass stability can be obtained without $Yb_2O_3$, so that $Yb_2O_3$ may not be introduced. In this case, there can be produced the effect of reducing a glass production cost.

$Li_2O$, $Na_2O$ and $K_2O$ are optional components that works to improve the meltability and to decrease the glass transition temperature. When the total content of $Li_2O$, $Na_2O$ and $K_2O$ exceeds 10%, it is difficult to realize the desired refractive index, and the chemical durability also deteriorates. The total content of $Li_2O$, $Na_2O$ and $K_2O$ is hence limited to 0 to 10%. The total content of $Li_2O$, $Na_2O$ and $K_2O$ is preferably in the range of 0 to 8%, more preferably 0 to 6%, still more preferably 0 to 4%, yet more preferably 0 to 2%. When it is sought to impart the glass with a higher refractive index while maintaining the glass stability, it is further preferred to incorporate none of the above alkali metal oxides.

MgO, CaO, SrO and BaO work to improve the meltability of the glass and to improve the transmittance of the glass in the visible region. When introduced in the form of carbonates or nitrates, they also produce a defoaming effect. However, when the total content thereof exceeds 10%, the liquidus temperature increases, and the devitrification resistance deteriorates. Moreover, the refractive index decreases, and the chemical durability deteriorates. The total content of MgO, CaO, SrO and BaO is hence limited to 0 to 10%. The total content of MgO, CaO, SrO and BaO is preferably in the range of 0 to 8%, more preferably 0 to 6%, still more preferably 0 to 4%, yet more preferably 0 to 2%, further more preferably 0 to 1%. When it is sought to impart the glass with a higher refractive index while maintaining the glass stability, it is still further more preferred to incorporate none of the alkaline earth metal oxides.

$Ta_2O_5$ is a component remarkably effective for imparting the glass with high-refractivity low-dispersion properties and improving the glass stability. Since, however, it is a very expensive component, the content thereof is limited to 12% or less for achieving the stable supply of the high-refractivity low-dispersion glass that is the object of this invention. When the content of $Ta_2O_5$ is limited to the above range, the refractive index decreases, or the glass stability greatly decreases. However, when at least one of $TiO_2$ and $Nb_2O_5$ is incorporated or when both of $TiO_2$ and $TiO_2$ are incorporated, the content of $Ta_2O_5$ can be decreased without impairing the high-refractivity low-dispersion properties and the glass stability.

Further, when the content of $Ta_2O_5$ exceeds 12%, the liquidus temperature increases, and the devitrification resistance deteriorates. The content of $Ta_2O_5$ is hence limited to 0 to 12%. The content of $Ta_2O_5$ is preferably in the range of 0 to 10%, more preferably 0 to 8%, still more preferably 0 to 8%, yet more preferably 0 to 6%, further more preferably 0 to 4%, still further more preferably 0 to 2%, yet further more preferably 0 to 1%, and no content of $Ta_2O_5$ is particularly preferred.

However, when it has priority to improve the glass stability more, it is preferred to introduce a small amount of $Ta_2O_5$. When a small amount of $Ta_2O_5$ is introduced, not only the glass stability can be more improved, but also the content of $La_2O_3$ can be decreased while maintaining a high refractive index, so that the temperature for melting the glass can be decreased. When the melting temperature is decreased, the erosion of a melting vessel and the coloring of the glass can be decreased or inhibited as already described.

In this case, the content of $Ta_2O_5$ is preferably in the range of 0.5 to 12%, more preferably 1 to 12%, still more preferably 2 to 12%.

$GeO_2$ is a network-forming oxide and works to increase the refractive index, so that it is a component that maintains the glass stability and at the same time can increase the refractive index. However, it is a very expensive component, and it is a component of which the reduction in amount is desirable together with the Ta component. In this invention, the composition is determined as explained above, so that even if the content of $GeO_2$ is limited to 5% or less, both the realization of the desired optical properties and the realization of the glass stability can be satisfied. The content of $GeO_2$ is hence limited to 0 to 5%. The content of $GeO_2$ is preferably in the range of 0 to 3%, more preferably 0 to 2.5%, still more preferably 0 to 2%, yet more preferably 0 to 1.5%, further more preferably 0 to 1%, still further more preferably 0 to 0.5%. Containing no $GeO_2$, that is, being a Ge-free glass is particularly preferred. Since $GeO_2$ is a network-forming oxide as described above, it can be said that an optical glass of which the $GeO_2$ content is limited as described above differs in basic composition from an optical glass that realizes high-refractivity low-dispersion properties on the premise that a predetermined amount or more of $GeO_2$ is contained. Further, $GeO_2$ is a specific component that maintains the glass stability and at the same time can increase the refractive index, and it has a remarkably deep significance to provide an optical glass having the above refractive index and Abbe's number and having excellent stability while the amount of expensive $GeO_2$ in use is limited.

$Bi_2O_3$ works to increase the refractive index and also to improve the glass stability. However, when the content thereof exceeds 10%, the light transmittance in the visible region decreases, and the glass tends to be colored. The content of $Bi_2O_3$ is hence limited to 0 to 10%. The content of $Bi_2O_3$ is preferably in the range of 0 to 5%, more preferably 0 to 2%, still more preferably 0 to 1%, and no content of $Bi_2O_3$ is particularly preferred.

$Al_2O_3$ works to improve the glass stability and chemical durability as far as its content is small. However, when its content exceeds 10%, the liquidus temperature increases, and the devitrification resistance deteriorates. The content of $Al_2O_3$ is hence limited to 0 to 10%. The content of $Al_2O_3$ is preferably in the range of 0 to 5%, more preferably 0 to 2%, still more preferably 0 to 1, and no content of $Al_2O_3$ is particularly preferred.

$Sb_2O_3$ can be added as a clarifier, and when it is added in a small amount, it keeps the inclusion of impurities such as Fe, etc., from decreasing the light transmittance. Due to its strong oxidizing activity, however, it promotes to deteriorate the molding surface of a press mold when press-molding is carried out. Further, when $Sb_2O_3$ is added, the glass tends to be increasingly colored. The amount of $Sb_2O_3$ to be added on the basis of a glass composition excluding $Sb_2O_3$ is preferably 0 to 1%, more preferably 0 to 0.5%, still more preferably 0 to 0.1%. Adding no $Sb_2O_3$, that is, being an Sb-free glass is particularly preferred.

$SnO_2$ can be added as a clarifier. However, when it is added in an amount of over 1% on the basis of a glass composition excluding $SnO_2$, the glass is colored, and when the re-molding of the glass by heating and softening it, such as press-molding, is carried out, Sn constitutes a starting point for crystal germ, and a tendency to devitrification takes place. The amount of $SnO_2$ to be added on the basis of a composition excluding $SnO_2$ is preferably 0 to 1%, more preferably 0 to 0.5%, and adding no $SnO_2$ is particularly preferred.

The optical glass of this invention has realized the optical properties of a high-refractivity low-dispersion while the glass stability is maintained, and it obviates the incorporation of components such as Lu and Hf. Since Lu and Hf are expensive components, the content of each of $Lu_2O_3$ and $HfO_2$ is preferably limited to 0 to 1%, more preferably, to 0 to 0.5%. Incorporating no $Lu_2O_3$ and incorporating no $HfO_2$ are particularly preferred, respectively.

Environmental impacts considered, further, it is preferred to introduce none of As, Pb, U, Th, Te and Cd.

For taking advantage of excellent light transmittance, it is preferred to introduce none of substances that are coloring factors such as Cu, Cr, V, Fe, Ni, Co, etc.

(Properties of Optical Glass)

The optical glass of this invention has a refractive index nd of 1.89 to 2.0. When lenses are produced from the above optical glass, a glass having a higher refractive index ensures that the curve of a lens surface can be moderated (the absolute value of a curvature radius is increased) if the lens has a constant focal length, and there can be produced an effect that the making of lenses is easier or that the correction of aberration is easier. Further, when an image-sensing optical system or a projection optical system is constituted from a combination of a plurality of lenses, the optical system can be downsized.

In the optical systems such as an image-sensing optical system and a projection optical system, when an optical path is bent by the use of a prism for reducing an optical path length, a higher refractive index of a glass constituting the prism is effective for reducing the optical path length. In the image-sensing optical system, the angle of view can be increased. For the above reasons, the lower limit of the refractive index nd is determined as follows. On the other hand, when the refractive index is increased to excess, the glass stability decreases, and it tends to be difficult to produce the glass, so that the upper limit of the refractive index nd is determined as follows. The lower limit of the refractive index nd is preferably 1.892, more preferably 1.894, still more preferably 1.895, yet more preferably 1.90. The upper limit thereof is preferably 1.98, more preferably 1.95, still more preferably 1.94, yet more preferably 1.93.

The optical glass of this invention has an Abbe's number vd of 32 to 38. When a lens formed of the optical glass of this invention and a lens formed of a high-refractivity high-dispersion glass are combined, there can be obtained a compact optical system for correcting chromatic aberration. In such an optical system for correction chromatic aberration, a larger difference between the Abbe's number of the optical glass of this invention and the Abbe's number of the high-refractivity high-dispersion glass is advantageous for realizing excellent chromatic aberration correction. For this reason, the lower limit of the Abbe's number vd is adjusted to the above value. When it is sought to impart the property of low dispersion excessively, the glass stability and the moldability of a molten glass decrease, and it is difficult to produce a glass. Therefore, the upper limit of the Abbe's number vd is adjusted to the above value. The lower limit of the Abbe's number is preferably 32.5, more preferably 33.0, still more preferably 33.5, yet more preferably 34.0, further more preferably 34.5. The upper limit of the Abbe's number vd is preferably 37.9, more preferably 37.8, still more preferably 37.7.

The refractive index of a glass having a smaller Abbe's number vd, i.e., a glass having a higher dispersion can be more easily increased while maintaining the stability and the viscosity during the molding of a molten glass. However, even if the properties of higher-refractivity lower-dispersion within the above optical properties are imparted, the glass stability and moldability of a molten glass can be maintained, so that there can be realized and optical glass that is in particular useful in optical design. From this viewpoint, an optical glass having optical properties that satisfy the following expression (1) is preferred, an optical glass having optical properties that satisfy the following expression (2) is more preferred, an optical glass having optical properties that satisfy the following expression (3) is still more preferred, an optical glass having optical properties that satisfy the following expression (4) is yet more preferred, an optical glass having optical properties that satisfy the following expression (5) is further more preferred, and an optical glass having optical properties that satisfy the following expression (6) is still further more preferred.

$$nd \geq 2.54 - 0.02 \times vd \quad (1)$$

$$nd \geq 2.55 - 0.02 \times vd \quad (2)$$

$$nd \geq 2.56 - 0.02 \times vd \quad (3)$$

$$nd \geq 2.57 - 0.02 \times vd \quad (4)$$

$$nd \geq 2.58 - 0.02 \times vd \quad (5)$$

$$nd \geq 2.59 - 0.02 \times vd \quad (6)$$

When the ranges defined by the expressions (1) to (6) and the preferred lower limit of refractive index nd are combined, in the range of this invention, a range defined by
    $nd \geq 2.54 - 0.02 \times vd$ (in which $vd > 32.5$), and $nd \geq 1.89$ (in which $vd \leq 32.5$)
is preferred, a range defined by
    $nd \geq 2.55 - 0.02 \times vd$ (in which $vd > 33.0$), and $nd \geq 1.89$ (in which $vd \leq 33.0$)
is more preferred, a range defined by
    $nd \geq 2.56 - 0.02 \times vd$ (in which $vd > 33.5$), and $nd \geq 1.89$ (in which $vd \leq 33.5$)
is still more preferred, a range defined by
    $nd \geq 2.57 - 0.02 \times vd$ (in which $vd > 34.0$), and $nd \geq 1.89$ (in which $vd \leq 34.0$)
is yet more preferred, a range defined by
    $nd \geq 2.58 - 0.02 \times vd$ (in which $vd > 34.5$), and $nd \geq 1.89$ (in which $vd \leq 34.5$)
is further more preferred, and a range defined by
    $nd \geq 2.59 - 0.02 \times vd$ (in which $vd > 35.0$), and $nd \geq 1.89$ (in which $vd \leq 35.0$)
is still further more preferred.

The above embodiment is a range in which a refractive index of 1.89 or more and the expressions (1) to (6) are established. The other four ranges, i.e., a range in which a refractive index of 1.892 or more and the expressions (1) to (6) are established, a range in which a refractive index of 1.894 or more and the expressions (1) to (6) are established, a range in which a refractive index of 1.895 or more and the expressions (1) to (6) are established, and a range in which a refractive index of 1.90 or more and the expressions (1) to (6) are established can be similarly defined.

On the other hand, for realizing far more excellent glass stability, an optical glass having optical properties that satisfy the following expression (7) is preferred, an optical glass having optical properties that satisfy the following expression (8) is more preferred, and an optical glass having optical properties that satisfy the following expression (9) is still more preferred.

$$nd \leq 2.69 - 0.02 \times vd \quad (7)$$

$$nd \leq 2.68 - 0.02 \times vd \quad (8)$$

$$nd \leq 2.67 - 0.02 \times vd \quad (9)$$

When the ranges defined by the expressions (7) to (9) and the preferred upper limit of refractive index nd are combined, in the range of this invention, a range defined by
    $nd \leq 2.69 - 0.02 \times vd$ (in which $vd > 34.5$), and $nd \leq 2.0$ (in which $vd \leq 34.5$)
is preferred, a range defined by
    $nd \leq 2.68 - 0.02 \times vd$ (in which $vd > 34.0$), and $nd \leq 2.0$ (in which $vd \leq 34.0$)
is more preferred, and a range defined by
    $nd \leq 2.67 - 0.02 \times vd$ (in which $vd > 33.5$), and $nd \leq 2.0$ (in which $vd \leq 33.5$)
is still more preferred.

The above embodiment is a range in which a refractive index nd of 2.0 or less and the expressions (7) to (9) are established. The other four ranges, i.e., a range in which a refractive index of 1.98 or less and the expressions (7) to (9) are established, a range in which a refractive index of 1.95 or less and the expressions (7) to (9) are established, a range in which a refractive index of 1.94 or less and the expressions (7) to (9) are established and a range in which a refractive index of 1.93 or less and the expressions (7) to (9) are established can be also similarly defined.

(Coloring of Glass)

The coloring degree λ70 of the optical glass of this invention is 430 nm or less. The coloring degree λ70 corresponds to a wavelength at which a 10±0.1 mm thick glass having optically polished two opposite surfaces in parallel with each other exhibits a transmittance of 70% when measured for a spectral transmittance in the wavelength region of 280 nm to 700 nm. The above spectral transmittance or the above transmittance is a quantity represented by $I_{out}/I_{in}$ when light having an intensity of $I_{in}$ is caused to perpendicularly enter one of the above surfaces of the glass and light having an intensity of $I_{out}$ comes out of the other surface after the glass transmits the light, and it is a transmittance including a surface reflection loss on the above surface of the glass.

The surface reflection loss increases with an increase in the refractive index of a glass. Therefore, a high-refractivity glass having a small λ70 means that the coloring of the glass itself is remarkably reduced. When λ70 is adjusted to 430 nm or less, there can be provided an optical element for constituting an image-sensing optical system or projection optical system having an excellent color balance. In the image-sensing optical system or projection optical system, a plurality of lenses are used for correcting various aberrations. There is therefore a problem that when lenses formed of colored glasses are used, the transmitted light quantity of the entire optical system is decreased. In particular, an interchangeable lens of a single-lens reflex camera has a large aperture, so that the lens thickness is large, and when a colored lens is used, the transmitted light quantity is greatly decreased. When lenses are produced from the optical glass of this invention, a sufficient transmitted light quantity can be secured even in one single lens or the entire optical system, since the coloring thereof is remarkably reduced while it is a high-refractivity low-dispersion glass. Further, owning to a combination of its coloring that is reduced and the high-refractivity low-dispersion properties that it has, the image-sensing optical system and projection optical system can be downsized. For these reasons, the optical glass of this invention is suitable as an optical element material for constituting the image-sensing optical system and projection optical system, and it is suitable in particular as an optical element material for constituting an interchangeable lens of a single-lens reflex camera.

For coping with the above demands, an optical glass having λ70 in the above range is required. In the optical glass of this invention, further, the coloring degree is preferably in a range in which λ70 is 425 nm or less, more preferably in a range in which λ70 is 420 nm or less, still more preferably in a range in which λ70 is 415 nm or less, yet more preferably in a range in which λ70 is 410 nm or less, further more preferably in a range in which λ70 is 405 nm or less. The lower limit of λ70 is naturally restricted depending upon properties of the glass such as a refractive index and the composition of the glass.

In addition to the coloring degrees other than λ70, λ80 and λ5 may be employed. λ80 is a wavelength at which a transmittance of 80 is exhibited, and λ5 is a wavelength at which a transmittance of 5% is exhibited.

(Viscosity of Glass at Liquidus Temperature)

In a high-refractivity glass, in particular a high-refractivity low-dispersion glass, the temperature to be employed when a molten glass is caused to flow out and molded is generally increased for preventing its devitrification during molding of the molten glass. Therefore, the molten glass that is caused to flow out and molded has a very low viscosity, and it is difficult to produce a high-quality glass highly productively.

When the temperature employed when a glass is caused to flow out is high, a specific easy-volatile glass component volatilizes from the glass surface having a high temperature, and the glass surface is altered. As a result, an optically non-uniform portion called striae is formed in the glass surface. Further, when the viscosity that a glass has when it is caused to flow out and molded is low, a surface of the glass that is caused to flow out is taken into an inside to cause striae within the glass. Further, when the temperature that the glass has when it is caused to flow out is high, a mold in contact with the glass having a high temperature is likely to be thermally deteriorated and worn out.

When the viscosity of a high-refractivity low-dispersion glass at a liquidus temperature can be secured, the moldability of a molten glass can be improved, and a high-quality glass can be supplied highly productively. Further, the inhibition of the liquidus temperature from increasing works advantageously to improve the productivity of a high-quality glass.

For these reasons, the optical glass of this invention is preferably an optical glass having a viscosity, measured at its liquidus temperature, of 1 dPa·s or more. When the above viscosity property is imparted, the moldability of a molten glass of the high-refractivity low-dispersion glass can be remarkably improved. For more improving the above moldability, preferably, the viscosity at a liquidus temperature is adjusted to 1.2 dPa·s or more, more preferably, it is adjusted to 1.4 dPa·s or more, still more preferably, it is adjusted to 1.6 dPa·s, yet more preferably, it is adjusted to 2.0 dPa·s or more, further more preferably, it is adjusted to 2.5 dPa·s or more. The upper limit of the viscosity at a liquidus temperature is naturally restricted depending upon the component ranges of the above glass composition, while 30 dPa·s or less can be considered as a target.

From the above viewpoint, preferably, the liquidus temperature of the optical glass of this invention is adjusted to 1,300° C. or lower, more preferably it is adjusted to 1,280° C. or lower, still more preferably it is adjusted to 1,250° C. The lower limit of the liquidus temperature is naturally restricted depending upon the glass composition, while 1,000° C. or higher can be considered as a target.

(Glass Transition Temperature)

In the optical glass of this invention, a plurality of components for imparting a high refractive index are introduced in such a way that they are well-balanced, and it is ensured that the content of no specific component for imparting a high refractive index is dominantly large. Since ZnO is introduced as an essential component, further, the glass transition temperature of the optical glass can be kept low for a high-refractivity low-dispersion glass.

In the optical glass of this invention, the glass transition temperature is preferably in the range of 710° C. or lower, more preferably 700° C. or lower, still more preferably 695° C. or lower. When the glass transition temperature is kept low, the annealing temperature of the glass can be inhibited from increasing, and the thermal deterioration and wearing of an annealing apparatus can be suppressed. Further, the heating temperature during the press-molding of the glass by re-heating and softening can be kept low, and the thermal deterioration and wearing of a press-molding apparatus such as a press mold can be suppressed. Stainless steel is often used in an annealing furnace, a device for transferring a glass in the annealing furnace and a press-molding apparatus. Stainless steel has a deformation temperature around 700° C., and when the glass transition temperature is controlled so that it is in the above range, in particular 700° C. or lower, preferably 695° C. or lower, the deformation of stainless steel in the above steps can be prevented.

The lower limit of the glass transition temperature is naturally restricted depending upon the glass composition, while 650° C. or higher can be considered as a target.

(Devitrification Resistance During Re-Heating)

Figure 1:
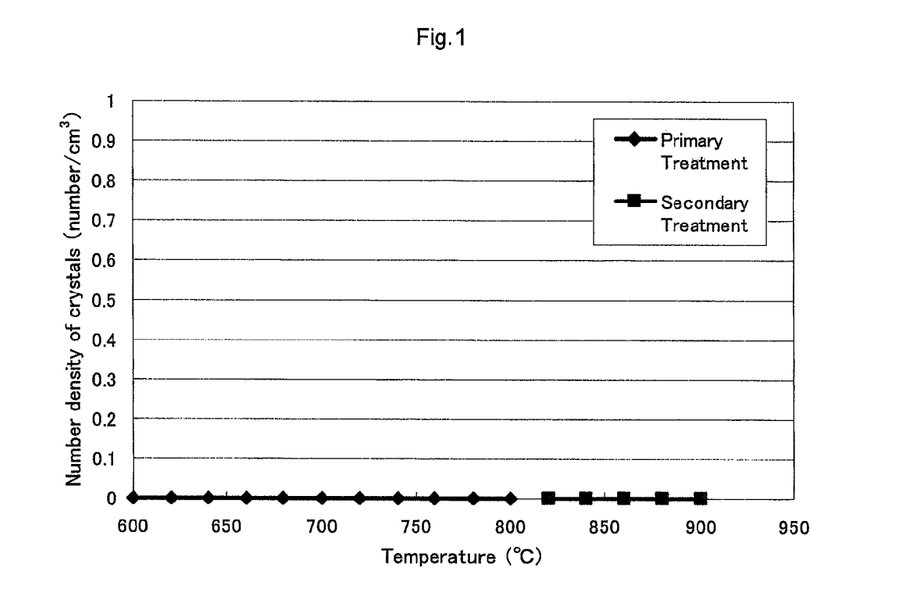
FIG. 1 is a graph showing a relationship between the temperatures of re-heating and the number density of crystals precipitated inside a glass with regard to the glass obtained in Example 1.

The optical glass of this invention is excellent in devitrification resistance during the molding of the glass by re-heating. In a preferred embodiment of the optical glass of this invention, no precipitation of a crystal inside a glass is observed after a glass sample is held at 600 to 800° C. for 10 minutes (primary treatment), then temperature-increased to 820° C. to 900° C. and held at this temperature for 10 minutes (secondary treatment). FIG. 1 shows a relationship between the temperatures of the primary treatment and secondary treatment (re-heating) and the number density of crystals precipitated inside a glass with regard to a glass obtained in Example 1. It is seen from FIG. 1 that since the number density of crystals during re-heating is very low, the optical glass of this invention is excellent in devitrification resistance. When the above test is carried out, a glass sample obtained by cutting and polishing is preferred as such, and for example, a glass sample having a size of 15×15×15 mm can be used. The presence or absence of crystal precipitation can be carried out by enlarging and observing an inside of a glass with an optical microscope of 100 magnifications.

Figure 2:
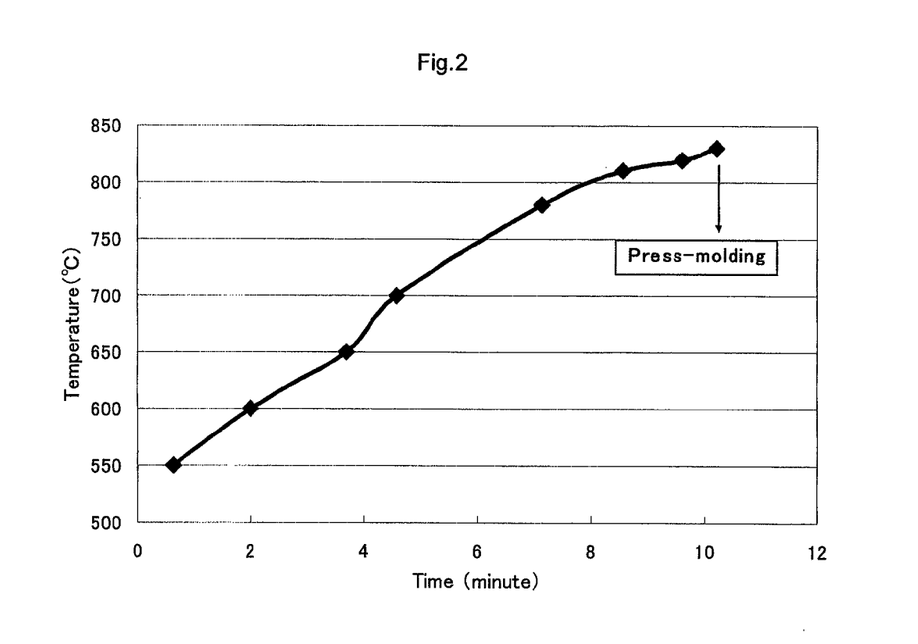
FIG. 2 is a graph showing a schedule of heating a glass gob in Example 4.

Further, when a glass sample (sample weight=6.05 g) obtained by cutting and barrel-polishing was re-heated and press-molded, for example, according to a heating schedule shown in FIG. 2, no precipitation of a crystal was observed within the press-molded glass.

Since the optical glass of this invention so excellent in devitrification resistance, it is suitable as a material for a press-molding glass material from which a high-quality press-molded product can be obtained.

(Process for Producing Optical Glass)

The process for producing the optical glass of this invention will be explained below. For example, a non-vitrified raw material obtained by weighing and mixing compound raw materials in the form of a powder, i.e., oxides, carbonates, nitrates, sulfates, hydroxides, etc., in accordance with an intended glass composition, or a vitrified raw material obtained by weighing and mixing cullet raw materials obtained by roughly melting the compound raw materials in accordance with an intended glass composition is supplied into a melting vessel made of a platinum alloy, then heated and melted. The above raw material is completely melted to obtain a molten glass (glass melt), and then the molten glass is temperature-increased to clarify it. The clarified glass is stirred and homogenized with a stirrer, continuously supplied into a glass flow-out pipe, caused to flow out and rapidly cooled to solidness to obtain a glass molded product.

The thus-obtained glass molded product is annealed to reduce or remove a strain in the molded product, and its refractive index is finely adjusted as required, to obtain a material for an optical element or a material for a press-molding glass material.

The press-molding glass gob of this invention will be explained below.

[Press-Molding Glass Gob]

The press-molding glass gob of this invention is characteristically formed of the above optical glass of this invention. The form of the gob is so determined depending upon the form of a press-molded product that the gob can be easily press-molded. The mass of the gob is also determined depending upon a press-molded product. In this invention, the glass excellent in stability is used, so that the glass does not easily devitrify even when it is re-heated and softened, and high-quality molded products can be stably produced.

Production embodiments of a press-molding glass gob are as follows.

In a first production embodiment, a molten glass flowing out of a flow pipe is continuously cast into a mold arranged horizontally below the flow pipe, and is molded in a plate form having a constant thickness. The molded glass is continuously withdrawn in the horizontal direction through an opening portion provided on a side of the mold. The glass molded material in the form of a plate is withdrawn with a belt conveyor. The glass molded material is withdrawn so as to ensure that it has a constant thickness by setting the withdrawing speed of the belt conveyor at a constant speed, whereby the glass molded material having a predetermined thickness and a predetermined width can be obtained. The glass molded material is carried into an annealing furnace with a belt conveyor to be gradually cooled. The gradually cooled glass molded material is cut or split in the thickness direction, and polished or barrel-polished to obtain press-molding glass gobs.

In a second production embodiment, a molten glass is cast into a cylindrical mold in place of the above mold and molded into a glass molded material having the form of a column. The glass molded material obtained by molding in the mold is withdrawn vertically downward at a constant rate from an opening portion in the bottom of the mold. The withdrawing can be carried out at such a speed that the level of a molten glass is constant. After the glass molded material is gradually cooled, it is cut or split and polished or barrel-polished to obtain press-molding glass gobs.

In a third production embodiment, a molding apparatus having a plurality of molds arranged on the circumference of a circular turn table at equal intervals is placed below a flow pipe, the turn table is index-turned, a molten glass is supplied to a mold in one stop position that is determined to be a molten glass supply position ("cast position" hereinafter), the supplied molten glass is molded into a glass molded material, and then the glass molded material is taken out in a predetermined mold stop position (take-out position) different from the cast position. It can be determined by taking account of the turning speed of the turn table, the cooling velocity of the glass, etc., which stop position should be the take-out position. The molten glass can be supplied to the mold in the cast position by a method in which a molten glass is dropped from the glass flow outlet of the flow pipe and a glass drop is received with the above mold, a method in which the mold at a stop in the cast position is caused to come near to the glass flow outlet to support the lower end of a molten glass flow, a narrow portion is formed in the middle of the glass flow, the mold is rapidly moved vertically downward timely as predetermined to separate a molten glass lower than the narrow portion, and the molten glass is received on the mold, a method in which a molten glass flow that is flowing out is cut with a cutting blade and the separated molten glass mass is received with the mold at a stop in the cast position, etc.

A known method can be used for molding on the mold. Above all, when the glass is molded while it is floated by applying a gas pressure upwardly to the glass mass with a gas ejected upwardly from the mold, there can be prevented the formation of creases on a glass molded material and the cracking of the glass molded material caused by a contact with the mold.

The form of the glass molded material can be a spherical form, a spheroidal form, a form having one axis of rotational symmetry and having two surfaces that face the axis direction of the axis of the rotational symmetry and that have a convex form outwardly each, etc., depending upon selection of a mold form or a method of ejecting the above gas. These forms are suitable for a glass gob to be used for producing an optical element such as a lens or an optical element blank by press-molding. The thus-obtained glass molded material can be used as a press-molding glass gob directly or after it is surface-polished or barrel-polished.

[Optical Element]

The optical element of this invention will be explained below.

The optical element of this invention is characteristically formed of the above optical glass of this invention. The optical glass of this invention has high-refractivity low-dispersion properties and has reduced or no contents of expensive components such as $Ta_2O_5$, $GeO_2$, etc., so that optical elements having an optically high value such as various lenses, prisms, etc., can be provided at a low cost.

Examples of the lens include various lenses such as a concave meniscus lens, a convex meniscus lens, a biconvex lens, a biconcave lens, a plano-convex lens, a plano-concave lens, etc., which have spherical or aspherical lens surfaces.

These lenses can correct chromatic aberration when combined with a lens formed of a high-refractivity high-dispersion glass, and they are suitable as lenses for correcting chromatic aberration. Further, they are lenses effective for downsizing an optical system.

Further, the optical element of this invention is formed of the optical glass having a coloring degree λ70 of 430 nm or less, so that it is suitable as an optical element to be incorporated into an image-sensing optical system that is required to have a high light transmittance, in particular an interchangeable lens (e.g., an interchangeable lens of a single-lens reflex camera) and a projection optical system.

Further, the prism has a high refractive index, and when it is incorporated into an image-sensing optical system, therefore, a downsized optical system having a wide angle of view can be realized by bending an optical path and directing it in the desired direction.

The optical-function surface of the optical element of this invention can be provided with a film that controls a light transmittance, such as an anti-reflection film, etc.

[Process for Producing Optical Element Blank]

The process for producing an optical element blank, provided by this invention, will be explained below.

The process for producing an optical element blank, provided by this invention, includes the following two embodiments.

(First Process for Producing an Optical Element Blank)

The first process for producing an optical element blank, provided by this invention, is a process for producing an optical element blank to be completed into an optical element by grinding and polishing, which comprises heating and softening the above press-molding glass gob of this invention and press-molding it.

According to this invention, there is used a gob formed of the above optical glass of this invention that is excellent in devitrification resistance when it is re-heated, so that an optical element blank can be produced without devitrifying it. Since the glass having reduced coloring is used, further, there can be produced a blank for obtaining an optical element that is sufficient in transmitted light quantity and excellent in color balance.

The optical element blank refers to a glass molded material having a form that is obtained by adding a processing margin to be removed by grinding and polishing to a form of an intended optical element and that is similar to the form of the optical element.

When an optical element blank is produced, there is prepared a press mold having molding surfaces that are the inverse of the above blank in form. The press mold is composed of mold parts including an upper mold member, a lower mold member and optionally a sleeve member, and the molding surfaces of the upper and lower mold members are provided with the above forms, or when the sleeve member is used, the molding surface of the sleeve member is provided with the above forms.

Then, a powder mold release agent such as boron nitride, or the like, is applied to the surface of the press-molding glass gob, the press-molding glass gob is introduced to the lower mold member preheated after it is heated and softened, and it is pressed with the lower mold member and the opposing upper mold member to mold it into an optical element blank.

Then, the optical element blank is released and taken out of the press mold, and it is annealing-treated. By the annealing-treatment, a strain within the glass is reduced, and optical properties such as a refractive index, etc., are brought into desired values.

Those which are known can be applied to the heating conditions and press-molding conditions for the glass gob, materials to be used for the press-mold, etc. The above steps can be carried out in atmosphere.

(Second Process for Producing an Optical Element)

The second process for producing an optical element blank, provided by this invention, is a process for producing an optical element blank to be completed into an optical element by grinding and polishing, which comprises melting glass raw materials, press-molding the resultant molten glass and thereby producing an optical element blank formed of the above optical glass of this invention.

The press mold is composed of mold parts such as an upper mold member, a lower mold member and optionally a sleeve member. The molding surfaces of the press mold are processed to ensure that they have forms that are the inverse of the forms of the above optical element blank as described above.

A powder mold release agent such as boron nitride, or the like, is uniformly applied onto the molding surface of the lower mold member, a molten glass obtained by the above process for producing an optical glass is caused to flow out onto the molding surface of the lower mold member, and when the amount of the molten glass on the lower mold member becomes a desired amount, the molten glass flow is cut with a cutting blade called shears. After a molten glass mass is so obtained on the lower mold member, the lower mold member with the molten glass mass on it is moved to a position where the upper mold member is on standby above, and the molten glass gob is pressed with the upper and lower mold members into an optical element blank.

Then, the optical element blank is released and taken out of the press mold, and it was annealing-treated. By the annealing-treatment, a strain within the glass is reduced, and optical properties such as a refractive index, etc., are brought into desired values.

Those which are known can be applied to the heating conditions and press-molding conditions for the glass gob, materials to be used for the press-mold, etc. The above steps can be carried out in atmosphere. In the second process for producing an optical element blank, a blank can be produced without devitrifying the glass. Further, there can be provided a blank that gives an optical element that secures a sufficient transmitted light quantity.

The process for producing an optical element, provided by this invention, will be explained below.

[Process for Producing Optical Element]

The process for producing an optical element, provided by this invention, can be largely classified into two embodiments.

A first embodiment of the process for producing an optical element (to be referred to as "optical element production process I" hereinafter), provided by this invention, comprises producing an optical element blank according to the above process of this invention and grinding and polishing the optical element blank. Known methods can be applied to the grinding and polishing. The optical element production process I is suitable for producing a spherical lens, a prism, etc.

A second embodiment of the process for producing an optical element (to be referred to as "optical element production process II" hereinafter), provided by this invention, is a process for producing an optical element, which comprises heating the above press-molding glass gob of this invention and precision press-molding the same. The precision press-molding can use a known press mold, and a known molding method can be applied thereto. The optical element production process II is suitable for producing an aspherical lens, a microlens, a diffraction grating, etc.

EXAMPLES

This invention will be explained with reference to Examples hereinafter, while this invention shall not be limited by these Examples.

Example 1

Glasses Nos. 1 to 22 having compositions shown in Tables 1 to 6 were obtained as follows. Carbonate, nitrates, sulfates, hydroxides, oxides, boric acid, etc., were used as raw materials, powders of these raw materials were weighed and fully mixed to obtain a raw material mixture, the raw material mixture was placed in a crucible formed of platinum, heated at 1,200 to 1,400° C. for 1 to 3 hours to melt it, and a glass melt was clarified and stirred to prepare a homogeneous molten glass. The molten glass was cast into a preheated mold and rapidly cooled, and the glass was held at a temperature in the vicinity of its glass transition temperature for 2 hours and gradually cooled. In this manner, optical glasses Nos. 1 to 11 were obtained. No precipitation of a crystal was recognized in any one of these glasses.

Properties of each glass were measured by the following methods. Tables 1 to 6 show the results.

(1) Refractive Index nd and Abbe's Number vd

A cooled optical glass was measured at a temperature decrease rate of 30° C. per hour.

(2) Glass Transition Temperature Tg Measured with a thermomechanical analyzer under conditions of a temperature elevation rate of 4° C./minute.

(3) Liquidus Temperature LT

A glass was placed in a furnace heated to a predetermined temperature and held therein for 2 hours, followed by cooling, and an inside of the glass was observed through an optical microscope of 100 magnifications. A liquidus temperature was determined on the basis of whether or not it had a crystal.

(4) Viscosity at Liquidus Temperature

A viscosity was measured according to Viscosity JIS Standard Z8803 by a viscosity measurement method using a coaxial double cylinder rotational viscometer.

(5) Specific Gravity

Measured by an Archimedean method.

(6) $\lambda 70$, $\lambda 80$ and $\lambda 5$

A 10±0.1 mm thick glass sample having two optically polished surfaces opposite to each other was measured for a spectral transmittance, and each was calculated on the basis of the results.

(7) Partial Dispersion Ratio $P_{g,F}$

Refractive indices nF, nc and ng were measured, and it was calculated on the basis of the results.

TABLE 1

| | No. | 1 | 2 | 3 | 4 |
|---|---|---|---|---|---|
| Composition [mass %] | $SiO_2$ | 8.11 | 8.03 | 7.54 | 7.53 |
| | $B_2O_3$ | 11.02 | 10.55 | 11.47 | 11.64 |
| | $La_2O_3$ | 43.95 | 43.53 | 44.32 | 43.42 |
| | $Gd_2O_3$ | 10.34 | 10.71 | 10.43 | 11.37 |
| | $Y_2O_3$ | 2.34 | 3.48 | 2.36 | 2.36 |
| | $Yb_2O_3$ | 0.00 | 0.00 | 0.00 | 0.00 |
| | ZnO | 5.49 | 5.44 | 5.54 | 4.68 |
| | $TiO_2$ | 6.22 | 6.16 | 6.27 | 6.26 |
| | $Nb_2O_5$ | 6.28 | 6.22 | 6.33 | 7.01 |
| | $ZrO_2$ | 5.05 | 4.69 | 5.74 | 5.73 |
| | $WO_3$ | 1.20 | 1.19 | 0.00 | 0.00 |
| | $Li_2O$ | 0.00 | 0.00 | 0.00 | 0.00 |
| | $Na_2O$ | 0.00 | 0.00 | 0.00 | 0.00 |
| | $K_2O$ | 0.00 | 0.00 | 0.00 | 0.00 |
| | MgO | 0.00 | 0.00 | 0.00 | 0.00 |
| | CaO | 0.00 | 0.00 | 0.00 | 0.00 |
| | SrO | 0.00 | 0.00 | 0.00 | 0.00 |
| | BaO | 0.00 | 0.00 | 0.00 | 0.00 |
| | $Ta_2O_5$ | 0.00 | 0.00 | 0.00 | 0.00 |
| | $GeO_2$ | 0.00 | 0.00 | 0.00 | 0.00 |
| | $Bi_2O_3$ | 0.00 | 0.00 | 0.00 | 0.00 |
| | $Al_2O_3$ | 0.00 | 0.00 | 0.00 | 0.00 |
| | Total | 100.00 | 100.00 | 100.00 | 100.00 |
| | $Sb_2O_3$ based on composition excluding $Sb_2O_3$ | 0.10 | 0.10 | 0.10 | 0.10 |
| | $SiO_2 + B_2O_3$ | 19.13 | 18.58 | 19.01 | 19.17 |
| | $SiO_2/B_2O_3$ | 0.74 | 0.76 | 0.66 | 0.65 |
| | $La_2O_3 + Gd_2O_3 + Y_2O_3$ | 56.63 | 57.72 | 57.11 | 57.15 |
| | $(Gd_2O_3 + Y_2O_3)/(La_2O_3 + Gd_2O_3 + Y_2O_3)$ | 0.22 | 0.25 | 0.22 | 0.24 |
| | $TiO_2 + Nb_2O_5$ | 12.50 | 12.38 | 12.60 | 13.27 |
| | $Li_2O + Na_2O + K_2O$ | 0.00 | 0.00 | 0.00 | 0.00 |
| | $MgO + CaO + SrO + BaO$ | 0.00 | 0.00 | 0.00 | 0.00 |
| | $Gd_2O_3/(Gd_2O_3 + Y_2O_3)$ | 0.82 | 0.75 | 0.82 | 0.83 |
| Properties | n d | 1.90757 | 1.9107 | 1.90928 | 1.91036 |
| | vd | 34.96 | 35.12 | 35.3 | 35.03 |
| | $P_{g,f}$ | 0.5832 | 0.58619 | 0.58579 | 0.58369 |
| | $\lambda 80$ [nm] | 497 | 490 | 500 | 494 |
| | $\lambda 70$ [nm] | 426 | 422 | 423 | 422 |
| | $\lambda 5$ [nm] | 360 | 359 | 358 | 359 |
| | Glass transition temperature [° C.] | 683 | 688 | 683 | 686 |
| | Liquidus temperature [° C.] | 1200 | 1220 | 1190 | 1190 |
| | Viscosity at liquidus temperature [dPa · s] | — | — | 3.08 | 3.12 |
| | Specific gravity | 4.99 | 5.04 | 4.99 | 4.98 |

TABLE 2

| | No. | 5 | 6 | 7 | 8 |
|---|---|---|---|---|---|
| Composition [mass %] | $SiO_2$ | 7.52 | 6.93 | 6.31 | 6.92 |
| | $B_2O_3$ | 11.49 | 12.03 | 12.44 | 12.03 |
| | $La_2O_3$ | 43.34 | 43.52 | 43.65 | 43.49 |
| | $Gd_2O_3$ | 11.35 | 11.40 | 11.43 | 11.39 |
| | $Y_2O_3$ | 2.36 | 2.37 | 2.37 | 2.60 |
| | $Yb_2O_3$ | 0.00 | 0.00 | 0.00 | 0.00 |
| | ZnO | 5.09 | 4.69 | 4.70 | 4.69 |
| | $TiO_2$ | 6.13 | 6.28 | 6.29 | 6.11 |
| | $Nb_2O_5$ | 7.00 | 7.03 | 7.05 | 7.03 |

TABLE 2-continued

| No. | | 5 | 6 | 7 | 8 |
|---|---|---|---|---|---|
| | $ZrO_2$ | 5.72 | 5.75 | 5.76 | 5.74 |
| | $WO_3$ | 0.00 | 0.00 | 0.00 | 0.00 |
| | $Li_2O$ | 0.00 | 0.00 | 0.00 | 0.00 |
| | $Na_2O$ | 0.00 | 0.00 | 0.00 | 0.00 |
| | $K_2O$ | 0.00 | 0.00 | 0.00 | 0.00 |
| | MgO | 0.00 | 0.00 | 0.00 | 0.00 |
| | CaO | 0.00 | 0.00 | 0.00 | 0.00 |
| | SrO | 0.00 | 0.00 | 0.00 | 0.00 |
| | BaO | 0.00 | 0.00 | 0.00 | 0.00 |
| | $Ta_2O_5$ | 0.00 | 0.00 | 0.00 | 0.00 |
| | $GeO_2$ | 0.00 | 0.00 | 0.00 | 0.00 |
| | $Bi_2O_3$ | 0.00 | 0.00 | 0.00 | 0.00 |
| | $Al_2O_3$ | 0.00 | 0.00 | 0.00 | 0.00 |
| | Total | 100.00 | 100.00 | 100.00 | 100.00 |
| | $Sb_2O_3$ based on composition excluding $Sb_2O_3$ | 0.10 | 0.10 | 0.10 | 0.10 |
| | $SiO_2 + B_2O_3$ | 19.01 | 18.96 | 18.75 | 18.95 |
| | $SiO_2/B_2O_3$ | 0.65 | 0.58 | 0.51 | 0.58 |
| | $La_2O_3 + Gd_2O_3 + Y_2O_3$ | 57.05 | 57.29 | 57.45 | 57.48 |
| | $(Gd_2O_3 + Y_2O_3)/(La_2O_3 + Gd_2O_3 + Y_2O_3)$ | 0.24 | 0.24 | 0.24 | 0.24 |
| | $TiO_2 + Nb_2O_5$ | 13.13 | 13.31 | 13.34 | 13.14 |
| | $Li_2O + Na_2O + K_2O$ | 0.00 | 0.00 | 0.00 | 0.00 |
| | MgO + CaO + SrO + BaO | 0.00 | 0.00 | 0.00 | 0.00 |
| | $Gd_2O_3/(Gd_2O_3 + Y_2O_3)$ | 0.83 | 0.83 | 0.83 | 0.81 |
| Properties | n d | 1.90994 | 1.91231 | 1.91389 | 1.91107 |
| | vd | 35.12 | 34.97 | 34.89 | 35.07 |
| | $P_{g,F}$ | 0.5851 | 0.58298 | 0.58228 | 0.58045 |
| | λ80 [nm] | 495 | 492 | 494 | 498 |
| | λ70 [nm] | 422 | 422 | 423 | 423 |
| | λ5 [nm] | 358 | 359 | 359 | 359 |
| | Glass transition temperature [° C.] | 685 | 686 | 681 | 685 |
| | Liquidus temperature [° C.] | 1190 | 1175 | 1180 | 1175 |
| | Viscosity at liquidus temperature [dPa · s] | — | 3.2 | — | 3.31 |
| | Specific gravity | 4.98 | 5.00 | 5.01 | 5.00 |

TABLE 3

| | No. | 9 | 10 | 11 | 12 |
|---|---|---|---|---|---|
| Composition [mass %] | $SiO_2$ | 6.92 | 6.04 | 6.01 | 6.63 |
| | $B_2O_3$ | 12.03 | 12.70 | 12.64 | 11.53 |
| | $La_2O_3$ | 43.49 | 43.08 | 42.86 | 40.06 |
| | $Gd_2O_3$ | 11.39 | 11.51 | 11.45 | 10.92 |
| | $Y_2O_3$ | 2.60 | 2.39 | 2.38 | 2.49 |
| | $Yb_2O_3$ | 0.00 | 0.00 | 0.00 | 0.00 |
| | ZnO | 4.69 | 4.74 | 4.71 | 6.13 |
| | $TiO_2$ | 6.11 | 6.34 | 6.31 | 4.25 |
| | $Nb_2O_5$ | 7.03 | 7.10 | 7.06 | 1.40 |
| | $ZrO_2$ | 5.74 | 5.80 | 5.77 | 5.50 |
| | $WO_3$ | 0.00 | 0.00 | 0.00 | 0.00 |
| | $Li_2O$ | 0.00 | 0.00 | 0.00 | 0.00 |
| | $Na_2O$ | 0.00 | 0.00 | 0.00 | 0.00 |
| | $K_2O$ | 0.00 | 0.00 | 0.00 | 0.00 |
| | MgO | 0.00 | 0.00 | 0.00 | 0.00 |
| | CaO | 0.00 | 0.30 | 0.00 | 0.00 |
| | SrO | 0.00 | 0.00 | 0.00 | 0.00 |
| | BaO | 0.00 | 0.00 | 0.81 | 0.00 |
| | $Ta_2O_5$ | 0.00 | 0.00 | 0.00 | 11.09 |
| | $GeO_2$ | 0.00 | 0.00 | 0.00 | 0.00 |
| | $Bi_2O_3$ | 0.00 | 0.00 | 0.00 | 0.00 |
| | $Al_2O_3$ | 0.00 | 0.00 | 0.00 | 0.00 |
| | Total | 100.00 | 100.00 | 100.00 | 100.00 |
| | $Sb_2O_3$ based on composition excluding $Sb_2O_3$ | 0.00 | 0.00 | 0.00 | 0.00 |
| | $SiO_2 + B_2O_3$ | 18.95 | 18.74 | 18.65 | 18.16 |
| | $SiO_2/B_2O_3$ | 0.58 | 0.48 | 0.48 | 0.58 |
| | $La_2O_3 + Gd_2O_3 + Y_2O_3$ | 57.48 | 56.98 | 56.69 | 53.47 |
| | $(Gd_2O_3 + Y_2O_3)/(La_2O_3 + Gd_2O_3 + Y_2O_3)$ | 0.24 | 0.24 | 0.24 | 0.25 |

TABLE 3-continued

|  |  | No. | 9 | 10 | 11 | 12 |
|---|---|---|---|---|---|---|
|  |  | $TiO_2 + Nb_2O_5$ | 13.14 | 13.44 | 13.37 | 5.65 |
|  |  | $Li_2O + Na_2O + K_2O$ | 0.00 | 0.00 | 0.00 | 0.00 |
|  |  | $MgO + CaO + SrO + BaO$ | 0.00 | 0.30 | 0.81 | 0.00 |
|  |  | $Gd_2O_3/(Gd_2O_3 + Y_2O_3)$ | 0.81 | 0.83 | 0.83 | 0.81 |
| Properties |  | n d | 1.91107 | 1.91271 | 1.9123 | 1.8964 |
|  |  | vd | 35.07 | 35.05 | 34.99 | 37.32 |
|  |  | $P_{g,F}$ | 0.58045 | 0.58833 | 0.58573 | 0.57993 |
|  |  | λ80 [nm] | 500 | 485 | 485 | 469 |
|  |  | λ70 [nm] | 405 | 405 | 404 | 395 |
|  |  | λ5 [nm] | 351 | 351 | 351 | 346 |
|  |  | Glass transition temperature [° C.] | 685 | — | — | — |
|  |  | Liquidus temperature [° C.] | 1175 | — | — | 1200 |
|  |  | Viscosity at liquidus temperature [dPa · s] | 3.31 | — | — | — |
|  |  | Specific gravity | 5.00 | 4.99 | 5.00 | 5.24 |

TABLE 4

|  |  | No. | 13 | 14 | 15 | 16 |
|---|---|---|---|---|---|---|
| Composition [mass %] | $SiO_2$ |  | 6.64 | 6.58 | 6.68 | 6.92 |
|  | $B_2O_3$ |  | 11.54 | 11.45 | 11.61 | 11.63 |
|  | $La_2O_3$ |  | 41.72 | 43.02 | 43.60 | 43.79 |
|  | $Gd_2O_3$ |  | 10.92 | 10.83 | 10.99 | 11.49 |
|  | $Y_2O_3$ |  | 2.49 | 2.47 | 2.51 | 2.60 |
|  | $Yb_2O_3$ |  | 0.00 | 0.00 | 0.00 | 0.00 |
|  | ZnO |  | 5.31 | 4.46 | 5.34 | 4.69 |
|  | $TiO_2$ |  | 4.25 | 4.22 | 4.28 | 6.11 |
|  | $Nb_2O_5$ |  | 2.74 | 2.71 | 2.75 | 7.03 |
|  | $ZrO_2$ |  | 5.51 | 5.46 | 5.54 | 5.74 |
|  | $WO_3$ |  | 0.00 | 0.00 | 0.00 | 0.00 |
|  | $Li_2O$ |  | 0.00 | 0.00 | 0.00 | 0.00 |
|  | $Na_2O$ |  | 0.00 | 0.00 | 0.00 | 0.00 |
|  | $K_2O$ |  | 0.00 | 0.00 | 0.00 | 0.00 |
|  | MgO |  | 0.00 | 0.00 | 0.00 | 0.00 |
|  | CaO |  | 0.00 | 0.00 | 0.00 | 0.00 |
|  | SrO |  | 0.00 | 0.00 | 0.00 | 0.00 |
|  | BaO |  | 0.00 | 0.00 | 0.00 | 0.00 |
|  | $Ta_2O_5$ |  | 8.88 | 8.80 | 6.70 | 0.00 |
|  | $GeO_2$ |  | 0.00 | 0.00 | 0.00 | 0.00 |
|  | $Bi_2O_3$ |  | 0.00 | 0.00 | 0.00 | 0.00 |
|  | $Al_2O_3$ |  | 0.00 | 0.00 | 0.00 | 0.00 |
|  | Total |  | 100.00 | 100.00 | 100.00 | 100.00 |
|  | $Sb_2O_3$ based on composition excluding $Sb_2O_3$ |  | 0.00 | 0.00 | 0.00 | 0.00 |
|  | $SiO_2 + B_2O_3$ |  | 18.18 | 18.03 | 18.29 | 18.55 |
|  | $SiO_2/B_2O_3$ |  | 0.58 | 0.57 | 0.58 | 0.60 |
|  | $La_2O_3 + Gd_2O_3 + Y_2O_3$ |  | 55.13 | 56.32 | 57.10 | 57.88 |
|  | $(Gd_2O_3 + Y_2O_3)/(La_2O_3 + Gd_2O_3 + Y_2O_3)$ |  | 0.24 | 0.24 | 0.24 | 0.24 |
|  | $TiO_2 + Nb_2O_5$ |  | 6.99 | 6.93 | 7.03 | 13.14 |
|  | $Li_2O + Na_2O + K_2O$ |  | 0.00 | 0.00 | 0.00 | 0.00 |
|  | $MgO + CaO + SrO + BaO$ |  | 0.00 | 0.00 | 0.00 | 0.00 |
|  | $Gd_2O_3/(Gd_2O_3 + Y_2O_3)$ |  | 0.81 | 0.81 | 0.81 | 0.82 |
| Properties | n d |  | 1.8997 | 1.90149 | 1.89766 | 1.91458 |
|  | vd |  | 37.04 | 37.1 | 37.4 | 34.87 |
|  | $P_{g,F}$ |  | 0.5776 | 0.57654 | 0.57708 | 0.58063 |
|  | λ80 [nm] |  | 472 | 477 | 494 | 491 |
|  | λ70 [nm] |  | 397 | 397 | 398 | 409 |
|  | λ5 [nm] |  | 347 | 346 | 346 | 352 |
|  | Glass transition temperature [° C.] |  | 685 | 691 | 684 | 685 |
|  | Liquidus temperature [° C.] |  | 1190 | 1190 | 1200 | 1185 |
|  | Viscosity at liquidus temperature [dPa · s] |  | — | — | — | — |
|  | Specific gravity |  | 5.21 | 5.23 | 5.19 | 5.02 |

TABLE 5

| | No. | 17 | 18 | 19 | 20 |
|---|---|---|---|---|---|
| Composition [mass %] | $SiO_2$ | 6.92 | 6.92 | 6.92 | 6.92 |
| | $B_2O_3$ | 11.83 | 11.53 | 12.83 | 12.43 |
| | $La_2O_3$ | 43.69 | 43.99 | 42.69 | 43.20 |
| | $Gd_2O_3$ | 11.39 | 11.39 | 11.39 | 11.28 |
| | $Y_2O_3$ | 2.60 | 2.60 | 2.60 | 2.60 |
| | $Yb_2O_3$ | 0.00 | 0.00 | 0.00 | 0.00 |
| | ZnO | 4.69 | 4.69 | 4.69 | 4.69 |
| | $TiO_2$ | 6.11 | 6.11 | 6.11 | 6.11 |
| | $Nb_2O_5$ | 7.03 | 7.03 | 7.03 | 7.03 |
| | $ZrO_2$ | 5.74 | 5.74 | 5.74 | 5.74 |
| | $WO_3$ | 0.00 | 0.00 | 0.00 | 0.00 |
| | $Li_2O$ | 0.00 | 0.00 | 0.00 | 0.00 |
| | $Na_2O$ | 0.00 | 0.00 | 0.00 | 0.00 |
| | $K_2O$ | 0.00 | 0.00 | 0.00 | 0.00 |
| | MgO | 0.00 | 0.00 | 0.00 | 0.00 |
| | CaO | 0.00 | 0.00 | 0.00 | 0.00 |
| | SrO | 0.00 | 0.00 | 0.00 | 0.00 |
| | BaO | 0.00 | 0.00 | 0.00 | 0.00 |
| | $Ta_2O_5$ | 0.00 | 0.00 | 0.00 | 0.00 |
| | $GeO_2$ | 0.00 | 0.00 | 0.00 | 0.00 |
| | $Bi_2O_3$ | 0.00 | 0.00 | 0.00 | 0.00 |
| | $Al_2O_3$ | 0.00 | 0.00 | 0.00 | 0.00 |
| | Total | 100.00 | 100.00 | 100.00 | 100.00 |
| | $Sb_2O_3$ based on composition excluding $Sb_2O_3$ | 0.00 | 0.00 | 0.00 | 0.00 |
| | $SiO_2 + B_2O_3$ | 18.75 | 18.45 | 19.75 | 19.35 |
| | $SiO_2/B_2O_3$ | 0.58 | 0.60 | 0.54 | 0.56 |
| | $La_2O_3 + Gd_2O_3 + Y_2O_3$ | 57.68 | 57.98 | 56.68 | 57.08 |
| | $(Gd_2O_3 + Y_2O_3)/(La_2O_3 + Gd_2O_3 + Y_2O_3)$ | 0.24 | 0.24 | 0.25 | 0.24 |
| | $TiO_2 + Nb_2O_5$ | 13.14 | 13.14 | 13.14 | 13.14 |
| | $Li_2O + Na_2O + K_2O$ | 0.00 | 0.00 | 0.00 | 0.00 |
| | $MgO + CaO + SrO + BaO$ | 0.00 | 0.00 | 0.00 | 0.00 |
| | $Gd_2O_3/(Gd_2O_3 + Y_2O_3)$ | 0.81 | 0.81 | 0.81 | 0.81 |
| Properties | n d | 1.91261 | 1.91497 | 1.90443 | 1.90636 |
| | νd | 35.01 | 34.92 | 35.26 | 35.23 |
| | $P_{g,F}$ | 0.58343 | 0.58168 | 0.58441 | 0.58259 |
| | λ80 [nm] | 487 | 493 | 479 | 482 |
| | λ70 [nm] | 407 | 408 | 405 | 405 |
| | λ5 [nm] | 351 | 351 | 352 | 352 |
| | Glass transition temperature [° C.] | 683 | 684 | 686 | 687 |
| | Liquidus temperature [° C.] | 1175 | 1185 | 1175 | 1175 |
| | Viscosity at liquidus temperature [dPa · s] | — | — | — | — |
| | Specific gravity | 5.01 | 5.03 | 4.94 | 4.96 |

TABLE 6

| | No. | 21 | 22 |
|---|---|---|---|
| Composition [mass %] | $SiO_2$ | 6.96 | 6.98 |
| | $B_2O_3$ | 11.90 | 12.14 |
| | $La_2O_3$ | 43.36 | 42.99 |
| | $Gd_2O_3$ | 11.46 | 11.49 |
| | $Y_2O_3$ | 2.62 | 2.62 |
| | $Yb_2O_3$ | 0.00 | 0.00 |
| | ZnO | 4.71 | 4.73 |
| | $TiO_2$ | 6.15 | 6.16 |
| | $Nb_2O_5$ | 7.07 | 7.10 |
| | $ZrO_2$ | 5.77 | 5.79 |
| | $WO_3$ | 0.00 | 0.00 |
| | $Li_2O$ | 0.00 | 0.00 |
| | $Na_2O$ | 0.00 | 0.00 |
| | $K_2O$ | 0.00 | 0.00 |
| | MgO | 0.00 | 0.00 |
| | CaO | 0.00 | 0.00 |
| | SrO | 0.00 | 0.00 |
| | BaO | 0.00 | 0.00 |
| | $Ta_2O_5$ | 0.00 | 0.00 |
| | $GeO_2$ | 0.00 | 0.00 |
| | $Bi_2O_3$ | 0.00 | 0.00 |
| | $Al_2O_3$ | 0.00 | 0.00 |
| | Total | 100.00 | 100.00 |
| | $Sb_2O_3$ based on composition excluding $Sb_2O_3$ | 0.00 | 0.00 |
| | $SiO_2 + B_2O_3$ | 18.86 | 19.12 |
| | $SiO_2/B_2O_3$ | 0.58 | 0.57 |
| | $La_2O_3 + Gd_2O_3 + Y_2O_3$ | 57.44 | 57.10 |
| | $(Gd_2O_3 + Y_2O_3)/(La_2O_3 + Gd_2O_3 + Y_2O_3)$ | 0.25 | 0.25 |
| | $TiO_2 + Nb_2O_5$ | 13.22 | 13.26 |
| | $Li_2O + Na_2O + K_2O$ | 0.00 | 0.00 |
| | $MgO + CaO + SrO + BaO$ | 0.00 | 0.00 |
| | $Gd_2O_3/(Gd_2O_3 + Y_2O_3)$ | 0.81 | 0.81 |
| Properties | n d | 1.91236 | 1.91051 |
| | νd | 35.01 | 35.06 |
| | $P_{g,F}$ | 0.58327 | 0.58253 |
| | λ80 [nm] | 487 | 486 |
| | λ70 [nm] | 404 | 403 |
| | λ5 [nm] | 352 | 352 |

TABLE 6-continued

| No. | 21 | 22 |
|---|---|---|
| Glass transition temperature [° C.] | 683 | 682 |
| Liquidus temperature [° C.] | 1175 | 1175 |
| Viscosity at liquidus temperature [dPa · s] | — | — |
| Specific gravity | 5.00 | 4.99 |

Example 2

Press-molding glass gobs formed of the optical glasses Nos. 1 to 22 of Examples 1 were produced in the following manner.

Glass raw materials were formulated so as to give one the above glasses, the formulated materials were charged into a crucible formed of platinum, heated and melted, and the glass melt was clarified and stirred to give a molten glass. Then, the molten glass was caused to flow out from a flow pipe at a constant flow rate, cast into a mold arranged horizontally below the flow pipe and molded into a glass plate having a constant thickness. The thus-formed glass plate was continuously withdrawn in the horizontal direction from an opening portion provided in a side of the mold, carried into an annealing furnace by means of a belt conveyor and gradually cooled.

The gradually cooled glass plate was cut or split to prepare glass pieces, and these glass pieces were barrel-polished to obtain press-molding glass gobs.

In addition, there may be employed a constitution in which a cylindrical mold is arranged below the flow pipe, the molten glass is cast into the mold and molded into a columnar glass, the columnar glass is withdrawn vertically downward from the opening portion of bottom of the mold at a constant rate, then gradually cooled and cut or split to prepare glass pieces, and these glass pieces are barrel-polished to obtain press-molding glass gobs.

Example 3

A molten glass was caused to flow out of the flow pipe in the same manner as in Example 2, the lower end of flowing molten glass was received with a mold, the mold was rapidly moved downward to cut the molten glass flow by surface tension, and a desired amount of a molten glass mass was obtained on the mold. A gas pressure was applied to the glass by ejecting a gas from the mold, and the glass was molded into a glass mass while it was floated. It was taken out of the mold and annealed. The glass mass was barrel-polished, and press-molding glass gobs were obtained in the above manner.

Example 4

A mold release agent that was a boron nitride powder was uniformly applied to the entire surface of each of the press-molding glass gobs obtained in Example 3, and these gobs were softened by heating according to a heating schedule shown in FIG. 2 and press-molded to obtain blanks of various lenses such as a concave meniscus lens, a convex meniscus lens, a biconvex lens, a biconcave lens, a plano-convex lens, a plano-concave lens, etc., and a prism.

Example 5

Molten glasses were prepared in the same manner as in Example 2, and each molten glass was supplied on the molding surface of a lower mold member to which a mold release agent that was a boron nitride powder had bee applied. When the amount of each molten glass on the lower mold member became a desired amount, the molten glass flow was cut with a cutting blade.

Each molten glass mass obtained on the lower mold member in the above manner was pressed with an upper mold member and the lower mold member to obtain blanks of various lenses such as a concave meniscus lens, a convex meniscus lens, a biconvex lens, a biconcave lens, a plano-convex lens, a plano-concave lens, etc., and a prism.

Example 6

The blanks made in Examples 4 and 5 were annealed to ensure that a stain in each glass was reduced and that optical properties such as a refractive index were brought into desired values.

Then, the blanks were ground and polished to produce various lenses such as a concave meniscus lens, a convex meniscus lens, a biconvex lens, a biconcave lens, a plano-convex lens, a plano-concave lens, etc., and a prism. The thus-obtained optical elements may be surface-coated with an anti-reflection film each.

Example 7

Glass plates and columnar glasses were prepared in the same manner as in Example 2, and the thus-obtained glass molded materials were annealed to ensure that a stain in each material was reduced and that optical properties such as a refractive index were brought into desired values.

Then, these glass molded materials were cut, ground and polished to produce blanks of various lenses such as a concave meniscus lens, a convex meniscus lens, a biconvex lens, a biconcave lens, a plano-convex lens, a plano-concave lens, etc., and a prism. The thus-obtained optical elements may be surface-coated with an anti-reflection film each.

Example 8

The glass gobs prepared in Example 2 were softened by heating and precision press-molded with a press mold to obtain various aspherical lenses such as a concave meniscus lens, a convex meniscus lens, a biconvex lens, a biconcave lens, etc. The thus-obtained lenses may be surface-coated with an anti-reflection film each.

INDUSTRIAL UTILITY

This invention is an optical glass that can be stably supplied and coloring remarkably reduced and that has excellent glass stability and high-refractivity low-dispersion properties, and it is suitable for press-molding glass gobs, optical element blanks and optical elements.

The invention claimed is:
1. An optical glass comprising, by mass %,
5 to 12% of $SiO_2$,
9 to 15% of $B_2O_3$,
32 to 55% of $La_2O_3$,
45 to 65% of total of $La_2O_3$, $Gd_2O_3$ and $Y_2O_3$, wherein 0.1% or greater of $Gd_2O_3$ and 0.1% or greater of $Y_2O_3$ are contained,
1 to 8% of ZnO,
1 to 20% of total of $TiO_2$ and $Nb_2O_5$, wherein 0.1% or greater of $TiO_2$ and 0.1% or greater of $Nb_2O_5$ are contained,

0.5 to 15% of $ZrO_2$,
0 to 2% of $WO_3$,
0 to 20% of $Yb_2O_3$,
0 to 10% of total of $Li_2O$, $Na_2O$ and $K_2O$,
0 to 10% of total of MgO, CaO, SrO and BaO,
0 to 12% of $Ta_2O_5$,
0 to 5% of $GeO_2$,
0 to 10% of $Bi_2O_3$, and
0 to 10% of $Al_2O_3$,
wherein the mass ratio of the content of $SiO_2$ to the content of $B_2O_3$, ($SiO_2/B_2O_3$), is from 0.33 to 1.0, and the mass ratio of the total content of $Gd_2O_3$ and $Y_2O_3$ to the total content of $La_2O_3$, $Gd_2O_3$ and $Y_2O_3$, ($Gd_2O_3+Y_2O_3$)/($La_2O_3+Gd_2O_3+Y_2O_3$), is from 0.05 to 0.6,
the optical glass having a refractive index nd of 1.89 to 2.0 and an Abbe's number νd of 32 to 38 and having a coloring degree λ70 of 430 nm or less.

2. The optical glass of claim 1, which contains 0.1 to 25% of $Gd_2O_3$ and 0.1 to 20% of $Y_2O_3$.

3. The optical glass of claim 1, which contains 0.1 to 15% of $TiO_2$ and 0.1 to 15% of $Nb_2O_5$.

4. The optical glass of claim 1, which contains 0.5 to 15% of $ZrO_2$.

5. The optical glass of claim 1, which has a $Ta_2O_5$ content of 0 to 10%.

6. The optical glass of claim 1, which is a Ge-free glass.

7. The optical glass of claim 1, which has a liquidus temperature of 1,300° C. or lower.

8. The optical glass of claim 1, which has a glass transition temperature of 710° C. or lower.

9. A press-molding glass gob formed of the optical glass recited in claim 1.

10. The optical element formed of the optical glass recited in claim 1.

* * * * *